United States Patent Office 3,079,409
Patented Feb. 26, 1963

3,079,409
HYDROLYSIS OF 3-SEMICARBAZIDO STEROIDS
David Taub, Metuchen, Norman L. Wendler, Summit, and Chan-Hwa Kuo, Rahway, N.J., assignors to Merck & Co., Inc., Rahway, N.J., a corporation of New Jersey
No Drawing. Filed Dec. 31, 1958, Ser. No. 784,097
4 Claims. (Cl. 260—397.45)

This invention relates to processes for forming 3-keto steroids from 3-semicarbazido steroids.

Hydrolysis of 3-semicarbazido steroids which are double-bonded at the 4,5-position has been accomplished with dilute aqueous mineral acid. However, techniques which are conventional for the hydrolysis of 3-semicarbazido steroids unsaturated at the 4,5-position have been found to be inoperative for the hydrolysis of 3-semicarbazido steroids which are unsaturated at the 1,2 and 4,5 positions. This fact has been reported by H. L. Herzog et al., J. Am. Chem. Soc. 77, pages 4781 to 4784 (1955). Herzog et al. suggested hydrolysis of a 3-semicarbazido-$\Delta^{1,4}$ steroid (specifically, the 3,20-bis-semicarbazone of prednisolone) with nitrous acid, but were able to achieve a yield of only 5%.

According to the present invention it has been found that 3-semicarbazido steroids having an unsaturated A-ring can be hydrolyzed with an aqueous solution of a lower alkanoic acid at elevated temperature to form a 3-keto steroid having an unsaturated A-ring in high yield. This process is applicable to both steroids having a double bond at the 4,5-position and to steroids having double bonds at the 1,2 and 4,5 positions under the same conditions of reaction. The process is most advantageous, however, for the hydrolysis of the latter group of steroids, as these have been very difficult to hydrolyze by prior techniques.

The lower alkanoic acid is a water-miscible monocarboxylic acid, e.g. formic, acetic, propionic, or butyric acid. Acetic acid is preferred. The acid concentration may range from about 25% to about 90%, and best results are obtained with a concentration of about 40% to about 65%. The hydrolysis temperature may range from about 50% C. to the boiling point of the solution, and is preferably about 90° C. to about 100° C.

A further advantage of the present process is that 3,20-bis-semicarbazones and 17,20;20,21-bis-methylenedioxy-3-semicarbazido steroids can be hydrolyzed in a single step.

The process of the present invention is especially useful in hydrolysis of 3-semicarbazido steroids of the 1,4-pregnadiene series to 3-keto steroids of the 1,4-pregnadiene series. The 3-semicarbazido steroids having no additional hydrolyzable groups, the 3,20-bis-semicarbazido steroids of the 1,4-pregnadiene series, and the 17,20;20,21-bis-methylenedioxy-3-semicarbazido steroids of the 1,4-pregnadiene series can all be hydrolyzed according to the present invention, yielding, respectively, 3-keto steroids, 3,20-diketo steroids, and 3,20-diketo-17α,21-dihydroxy steroids of the 1,4-pregnadiene series. The reaction products are known anti-inflammatory agents.

Examples of steroids which can be prepared by the present invention are prednisolone from either prednisolone-3 - semicarbazone, prednisolone - 3,20-bis - semicarbazone, or 17,20;20,21-bis - methylenedioxy - 3 - semicarbazido-1,4-pregnadiene - 11β - ol; prednisone from prednisone-3-semicarbazone, prednisone - 3,20 - bis - semicarbazone, or 17α,20;20,21-bis-methylenedioxy - 3 - semicarbazido-1,4-pregnadiene-11-one; 16β - methylprednisolone from 16β-methylprednisolone-3-semicarbazone, 16β-methylprednisolone-3,20 - bis-semicarbazone, or 17α,20;20,21-bis-methylenedioxy-16β - methyl - 3 - semicarbazido - 1,4-pregnadiene-11-ol. Other non-reactive nuclear substituents such as 9α-fluoro and 16α-methyl may be present, either in addition to or in lieu of substituent groups in the compounds herein specifically enumerated.

Hydrocortisone can be obtained from hydrocortisone-3-semicarbazone, hydrocortisone-3,20-bis-semicarbazone, or 17α,20;20,21-bis - methylenedioxy - 3 - semicarbazido - 4-pregnene-11β - ol. Likewise 16β - methylhydrocortisone can be obtained from the corresponding 3-semicarbazone or 3,20-bis-semicarbazone, or from 17α,20;20,21-bis-methylenedioxy-16β - methyl - 3 - semicarbazido - 4 - pregnene-11β-ol.

This invention will be further illustrated with respect to the specific embodiments which follow:

EXAMPLE 1

Hydrolysis of Prednisolone-3,20-Bis-Semicarbazone

A solution of 500 mg. of prednisolone-3,20-bis-semicarbazone in 17 ml. of acetic acid and 17 ml. of water was heated on a steam bath five hours after nitrogen. The mixture was concentrated in vacuo, water was added, and the mixture extracted with ethyl acetate. The ethyl acetate layer was washed with aqueous potassium bicarbonate, followed by saturated sodium chloride solution, and dried over magnesium sulphate. Removal of the organic solvent and crystallization of the residue from acetone-ether gave prednisolone in approximately 70% yield.

Similar results are obtained in hot 40% aqueous formic acid.

EXAMPLE 2

Hydrolysis of 17α,20;20,21-Bis-Methylenedioxy-16β-Methyl-3-Semicarbazido-1,4-Pregnadiene-11β-Ol A solution of 210 mg. of 17α,20;20,21-bis-methylenedioxy-16β-methyl-3-semicarbazido-1,4-pregnadiene - 11β-ol in 15 ml. of acetic acid and 15 ml. of water was heated on a steam bath at 95° C. for four hours. The mixture was then cooled and concentrated in vacuo nearly to dryness. Aqueous sodium chloride was added and the mixture extracted with ethyl acetate. The ethyl acetate extract was washed with 5% aqueous potassium carbonate and aqueous sodium chloride, dried over magnesium sulphate and concentrated to dryness. The residue crystallized on trituration with ether to give 16β-methylprednisolone in 65% yield.

Similar results are obtained utilizing hot 60% aqueous propionic acid.

EXAMPLE 3

Hydrolysis of 17α,20;20,21-Bis-Methylenedioxy-16β-Methyl-3-Semicarbazido-4-Pregnene-11β-Ol A solution of 355 mg. of 17α,20;20,21-bis-methylenedioxy-16β-methyl-3-semicarbazido-4-pregnene - 11β - ol in 20 ml. of acetic acid and 20 ml. of water was heated at 95° C. on a steam bath for four hours. The reaction mixture was then worked up according to the procedure of Example 2, yielding 16β-methylhydrocortisone in 70% yield.

The preparation of the starting materials of Examples 2 and 3 is described in copending application of David Taub, Robert D. Hoffsommer, and Norman L. Wendler, Serial No. 758,697, filed September 3, 1958, now Patent No. 2,958,702.

What is claimed is:

1. A process for forming a 3-keto steroid of the pregnane series in which the 1,2 and 4,5 positions are double-bonded, which comprises reacting a 3-semicarbazido steroid of the pregnane series in which the 1,2 and 4,5 positions are double-bonded with an aqueous solution of about 25% to about 90% of a water-miscible, lower aliphatic monocarboxylic acid at a temperature of about 50° C., to the boiling point of the solution.

2. A process for forming a 3-keto steroid of the pregnane series in which the 1,2 and 4,5 positions are double-bonded, which comprises reacting a 3-semicarbazido steroid of the pregnane series in which the 1,2 and 4,5 positions are double-bonded with an aqueous solution of about 40% to about 65% of a water-miscible, lower aliphatic monocarboxylic acid at a temperature of about 90° C. to about 100° C.

3. A process for forming a 3,20-diketo steroid of the 1,4-pregnadiene series, which comprises reacting a 3,20-disemicarbazido steroid of the 1,4-pregnadiene series with an aqueous solution of about 40% to about 65% of acetic acid at a temperature of about 90° to about 100° C.

4. A process for forming a 17α,21-dihydroxy-3,20-diketo steroid of the 1,4-pregnadiene series, which comprises reacting a 17,20,20,21-bis-methylenedioxy-3-semicarbazido steroid of the 1,4-pregnadiene series with an aqueous solution of about 40% to about 65% of acetic acid at a temperature of about 90° to about 100° C.

References Cited in the file of this patent

UNITED STATES PATENTS

| | | |
|---|---|---|
| 2,590,978 | Kendall et al. | Apr. 1, 1952 |
| 2,781,367 | Day | Feb. 12, 1957 |
| 2,958,702 | Taub et al. | Nov. 1, 1960 |
| 2,966,504 | Taub et al. | Dec. 27, 1960 |